United States Patent
Yoon et al.

(10) Patent No.: US 8,914,062 B2
(45) Date of Patent: Dec. 16, 2014

(54) DUAL COMMUNICATIONS NETWORK BASE STATION APPARATUS

(71) Applicant: Samsung Electro-Mechanics Co., Ltd., Suwon-si (KR)

(72) Inventors: Chul Hwan Yoon, Suwon-si (KR); Seong Geun Kim, Suwon-si (KR); Ju Young Park, Suwon-si (KR); Sung Jae Yoon, Suwon-si (KR); Dae Seok Jang, Suwon-si (KR); Sang Wook Park, Suwon-si (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 212 days.

(21) Appl. No.: 13/710,226

(22) Filed: Dec. 10, 2012

(65) Prior Publication Data

US 2013/0150119 A1 Jun. 13, 2013

(30) Foreign Application Priority Data

Dec. 9, 2011 (KR) ........................ 10-2011-0132212

(51) Int. Cl.
*H04W 88/10* (2009.01)

(52) U.S. Cl.
CPC .................................... *H04W 88/10* (2013.01)
USPC ........ 455/552.1; 455/552; 375/267; 375/132; 375/295; 370/318

(58) Field of Classification Search
USPC ............... 455/552.1, 522; 375/267, 132, 295; 370/318
See application file for complete search history.

(56) References Cited

U.S. PATENT DOCUMENTS

| | | | | |
|---|---|---|---|---|
| 8,467,462 | B2 * | 6/2013 | Hamaguchi et al. | 375/260 |
| 8,532,693 | B2 * | 9/2013 | Shin et al. | 455/522 |
| 8,811,313 | B2 * | 8/2014 | Papasakellariou et al. | 370/329 |
| 2005/0286656 | A1 * | 12/2005 | Muralidhar et al. | 375/340 |
| 2007/0206529 | A1 | 9/2007 | Liu et al. | |
| 2013/0044699 | A1 * | 2/2013 | Eriksson | 370/329 |

FOREIGN PATENT DOCUMENTS

| | | |
|---|---|---|
| KR | 2007-0090588 A | 9/2007 |
| KR | 2008-0069536 A | 7/2008 |
| KR | 10-2010-0018305 A | 2/2010 |
| WO | 2008091107 A1 | 7/2008 |

OTHER PUBLICATIONS

Office Action issued in Korean Patent Application No. 10-2011-0132212 dated Feb. 22, 2013.

\* cited by examiner

*Primary Examiner* — Bobbak Safaipour

(74) *Attorney, Agent, or Firm* — McDermott Will & Emery LLP

(57) ABSTRACT

There is provided a dual communications network base station apparatus including: a first UTRA network transmitting and receiving first data including pairs information via a previously set first communications band; a second UTRA network transmitting and receiving second data including the pairs information via a second communications band different from the first communications band; a core network combining the first data and the second data by using the pairs information during wireless reception, dividing the first data and the second data including the pairs information according to a previously set division rate during wireless transmission, and providing the corresponding UTRA network with the divided first data and second data; and a server communicating data including the first and second data with the core network.

5 Claims, 2 Drawing Sheets

(NETWORK STRUCTURE FOR DATA ENHANCEMENT)

(NETWORK STRUCTURE FOR DATA ENHANCEMENT)

DUAL COMMUNICATIONS NETWORK BASE STATION APPARATUS

CROSS-REFERENCE TO RELATED APPLICATIONS

This application claims the priority of Korean Patent Application No. 10-2011-0132212 filed on Dec. 9, 2011, in the Korean Intellectual Property Office, the disclosure of which is incorporated herein by reference.

BACKGROUND OF THE INVENTION

1. Field of the Invention

The present invention relates to a dual communications network base station apparatus capable of efficiently transmitting data via two communications networks having different use frequency bands.

2. Description of the Related Art

In general, existing networks, a global system for mobile communications (GSM) network and a digital cordless system (DCS) network are relatively slow in terms of a data transmission speed thereof, as compared to a wide-band-code division multiple access (WCDMA) network.

In such an existing communications network environment, there are difficulties in increasing data transmission rates as it needs to build new base stations so as to improve data transmission rates.

In the above-described existing communications networks, transmission and reception are performed in a time divisional manner, and thus transmission is performed during a previously determined period of time, and reception is performed during a previously determined period of time.

Accordingly, as a method of increasing data transmission rates in existing communications networks, an increase in an expenditure for installing a new base station may be problematic, and thus, a method of increasing a data transmission rate while not incurring increased expenditure is required.

In particular, the method of increasing data transmission rates is needed in communications network infrastructure such as base stations that enable communications for mobile communications terminals.

SUMMARY OF THE INVENTION

An aspect of the present invention provides a dual communications network base station apparatus capable of efficiently transmitting data via two communications networks having different use frequency bands in a base station.

According to an aspect of the present invention, there is provided a dual communications network base station apparatus, including: a first UTRA (universal mobile telecommunications system (UMTS) terrestrial radio access) network that transmits and receives first data including pairs information via a previously set first communications band; a second UTRA network that transmits and receives second data including the pairs information via a second communications band different from the first communications band; a core network that combines the first data and the second data from the first and second UTRA networks by using the pairs information during wireless reception, divides the first data and the second data including the pairs information according to a previously set division rate during wireless transmission, and provides the corresponding UTRA network with the divided first data and the divided second data; and a server that communicates data including the first data and the second data with the core network.

In the first UTRA network, the first communications band may be set as a frequency band between 700 MHz~990 MHz.

In the second UTRA network, the second communications band may be set as a frequency band between 1700 MHz~2200 MHz.

The core network may divide the first data and the second data according to the division rate based on previously set searched communications network state information.

The communications network state information may be at least one of quality of service (QoS) information and signal to interference ratio (SIR) information.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
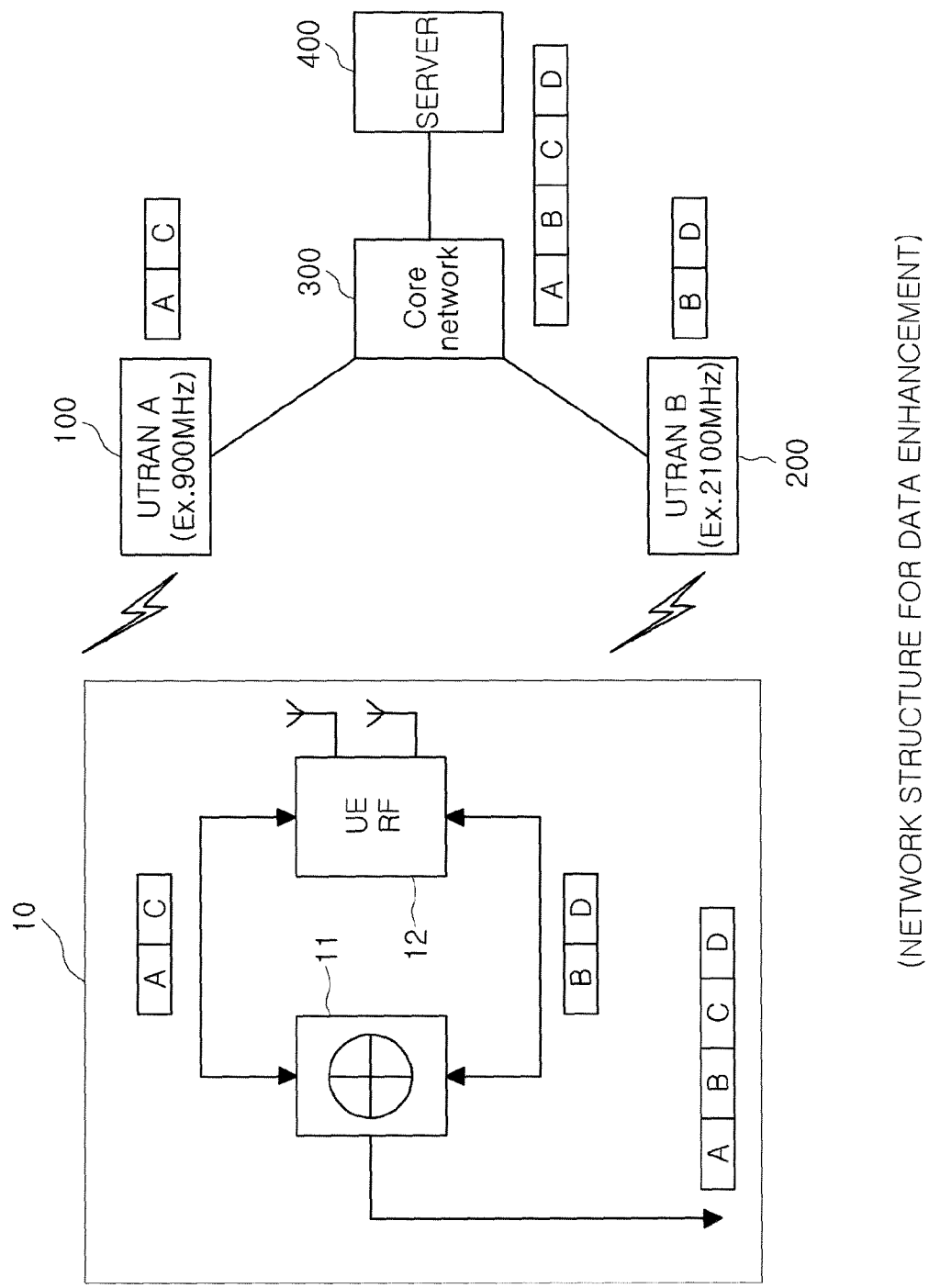
FIG. 1 is a block diagram of a dual communications network base station apparatus according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a block diagram of a dual communications network base station apparatus according to an embodiment of the present invention.

Referring to FIG. 1, the dual communications network base station apparatus according to an embodiment of the present invention may include a first UTRA network 100 that transmits and receives first data A and C including pairs information via a previously set first communications band, a second UTRA network 200 that transmits and receives second data B and D including the pairs information via a second communications band different from the first communications band, a core network 300 that combines the first data A and C and the second data B and D from the first and second UTRA networks 100 and 200 by using the pairs information during wireless reception and divides the first data A and C and the second data B and D including the pairs information according to a previously set division rate during wireless transmission to provide the divided data to a corresponding UTRA network, and a server 400 that communicates data including the first data A and C and the second data B and D with the core network 300.

In FIG. 1, UTRAN A corresponds to the first UTRA network 100, and UTRAN B corresponds to the second UTRA network 200.

Figure 2:
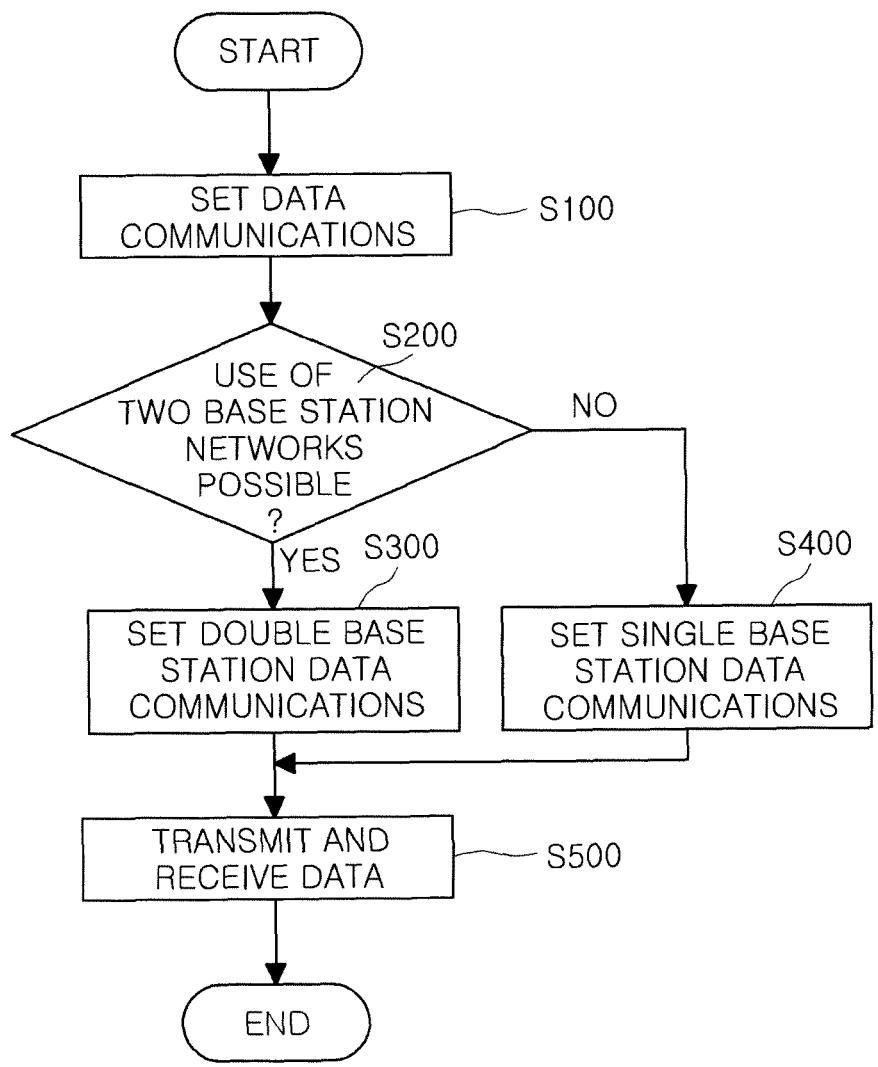
FIG. 2 is a flowchart of operations of a dual communications network base station apparatus according to an embodiment of the present invention.

FIG. 2 is a flowchart of operations of a dual communications network base station apparatus according to an embodiment of the present invention.

Referring to FIG. 2, the dual communications network base station apparatus according to an embodiment of the present invention performs a basic data communications setting (S100) in order to perform data communications with a single user terminal.

For example, the dual communications network base station apparatus previously determines whether dual communications using two base stations are available according to a communications environment between the user terminal and the dual communications network base station apparatus, i.e., a communications network state (S200); when dual communications using two base stations are available, the dual communications network base station apparatus performs setting for double base station data communications (S300); and, when communications using a single base station are available, the dual communications network base station apparatus sets single base station data communications (S400). In this regard, data division expenses may be set during the setting process.

At this time, the operation of determining whether the dual communications using two base stations are available may entail determining whether multi-communications using two or more base stations are available, according to an environment in which a base station apparatus is located.

As described above, after the communications setting is performed, data communications may be performed between a single user terminal and the dual communications network base station apparatus.

The operation of the dual communications network base station apparatus will now be described with reference to FIGS. 1 and 2 below.

Referring to FIG. 1, the first UTRA network 100 may transmit and receive the first data A and C including pairs information via a previously set first communications band.

For example, for the first UTRA network 100, an UTRA network is an abbreviation of a universal mobile telecommunications system (UMTS) terrestrial radio access network and refers to a simple mobile telephone communications base station network.

The first UTRA network 100 includes a plurality of nodes B and a radio network controller (RNC), and performs wireless communications with a user terminal 10 via the previously set first communications band.

In this regard, in the first UTRA network 100, the first communications band may be set as a frequency band between 700 MHz~990 MHz.

The second UTRA network 200 may transmit and receive the second data B and D including the pairs information via a second communications band different from the first communications band.

For example, for the second UTRA network 200, as described above, an UTRA network is an abbreviation of a universal mobile telecommunications system (UMTS) terrestrial radio access network and refers to a simple mobile telephone communications base station network.

The second UTRA network 200 includes a plurality of nodes B's and an RNC, and performs wireless communications with the user terminal 10 via the previously set second communications band.

In this regard, in the second UTRA network 200, the second communications band may be set as a frequency band between 1700 MHz~2200 MHz.

Meanwhile, the user terminal 10 may include a data processing unit 11 and an UE RF 12. The data processing unit 11 may divide data to be transmitted according to a previously set division rate or combine received data.

The UE RF 12 may transmit the divided data through a previously set communications band and receive data that is divided and transmitted through the previously set communications band.

For example, in a case in which the first UTRA network 100 sets the first communications band as 900 MHz, and the second UTRA network 200 sets the second communications band as 2100 MHz, when the data division rate is set as 50:50, the first UTRA network 100 may receive the first data A and C from among the data including A, B, C, and D, and the second UTRA network 200 may receive the second data B and D from among the data including A, B, C, and D.

The data division rate may be set based on previously searched communications network state information. The communications network state information may be at least one of quality of service (QoS) information and signal to interference ratio (SIR) information.

Meanwhile, each of the plurality of nodes B's may perform data communications with the user terminal 10 via a frequency band corresponding to the previously set first communications band. The RNC may be connected to each of the plurality of nodes B's and perform functions such as communications control, communications resource allocation, data transfer, and the like.

The core network 300 may combine the first data A and C and the second data B and D from the first and second UTRA networks 100 and 200 during wireless reception by using the pairs information. The core network 300 may divide the first data A and C and the second data B and D including the pairs information according to a previously set division rate during wireless transmission.

More specifically, the core network 300 may divide the first data A and C and the second data B and D according to the previously set division rate based on the previously searched communications network state information.

For example, in the core network 300, the communications network state information may be at least one of the quality of service (QoS) information and the signal to interference ratio (SIR) information.

The server 400 may communicate data including the first data A and C and the second data B and D with the core network 300.

As set forth above, according to embodiments of the invention, a base station can efficiently transmit data via two communications networks having different use frequency bands, thereby further increasing a data transmission speed by using two frequency bands, for example, a 900 MHz communications band and a 2100 MHz communications band, in a single portable terminal.

While the present invention has been shown and described in connection with the embodiments, it will be apparent to those skilled in the art that modifications and variations can be made without departing from the spirit and scope of the invention as defined by the appended claims.

What is claimed is:

1. A dual communications network base station apparatus comprising:

a first UTRA (universal mobile telecommunications system (UMTS) terrestrial radio access) network, transmitting and receiving first data including pairs information via a previously set first communications band;

a second UTRA network transmitting and receiving second data including the pairs information via a second communications band different from the first communications band;

a core network combining the first data and the second data from the first and second UTRA networks by using the pairs information during wireless reception, dividing the first data and the second data including the pairs information according to a previously set division rate during wireless transmission, and providing the corresponding UTRA network with the divided first data and the divided second data; and a server communicating data including the first data and the second data with the core network.

2. The dual communications network base station apparatus of claim 1, wherein, in the first UTRA network, the first communications band is set as a frequency band between 700 MHz~990 MHz.

3. The dual communications network base station apparatus of claim 1, wherein, in the second UTRA network, the second communications band is set as a frequency band between 1700 MHz~2200 MHz.

4. The dual communications network base station apparatus of claim 1, wherein the core network divides the first data and the second data according to the division rate based on previously set searched communications network state information.

5. The dual communications network base station apparatus of claim 4, wherein the communications network state information is at least one of quality of service (QoS) information and signal to interference ratio (SIR) information.

* * * * *